Figure 1:
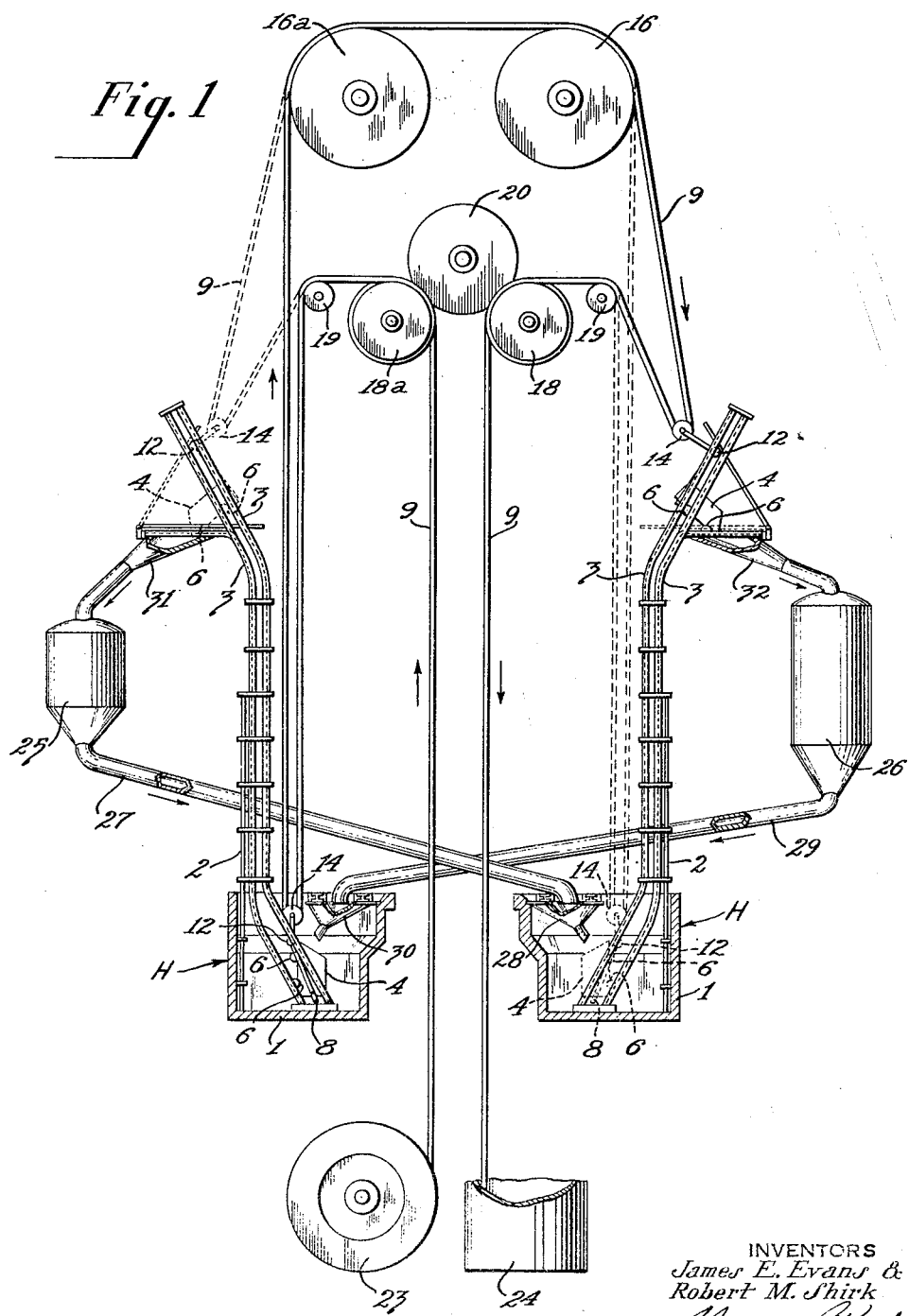

April 3, 1951     J. E. EVANS ET AL     2,546,991

CABLE SYSTEM FOR HOISTING MECHANISMS

Filed Nov. 1, 1946

INVENTORS
James E. Evans &
Robert M. Shirk
BY Gordon A. Kesler
ATTORNEY

Patented Apr. 3, 1951

2,546,991

UNITED STATES PATENT OFFICE 2,546,991

CABLE SYSTEM FOR HOISTING MECHANISMS

James E. Evans, Wallingford, Pa., and Robert M. Shirk, Wilmington, Del., assignors to Houdry Process Corporation, Wilmington, Del., a corporation of Delaware Application November 1, 1946, Serial No. 707,162

11 Claims. (Cl. 214—120)

Our invention relates to a cable system utilizable for operating a single hoisting mechanism or a plurality of such mechanisms.

It is common practice to utilize a conveyor such as a skip or bucket for elevating material from a lower loading position to an upper unloading position. A conveyor of this character is operated by a cable which is supported by a system of pulleys for movement in one direction during elevation of the conveyor and in reverse direction during descent of the conveyor. During continued operation, the cable eventually becomes worn to such extent as to require replacement and, to this end, it becomes necessary to discontinue operation of the conveyor system for an extended period. This is disadvantageous and is overcome in a novel manner as described below.

Thus, in accordance with the invention, we provide a cable which comprises an active or operative portion supported in suitable manner and connected to the skip or bucket conveyor. In order to elevate the conveyor, this active cable portion is moved in one direction on its supporting means whereas, when the conveyor is lowered, the active cable portion moves in reverse direction on said supporting means. Aside from the aforesaid active or operative cable portion, the cable of our invention comprises an unused or new cable portion adapted to be incorporated in said active cable portion at a rate corresponding with the rate of withdrawal of used cable therefrom, Hence, by properly selecting the rate of cable incorporation and withdrawal, unused cable may be gradually added to the active cable portion while withdrawing used cable therefrom to thereby prevent deterioration of said active cable portion below a safe operating limit.

When a pair of hoisting mechanisms are operated alternately as hereinafter described, the active cable portion of our invention is connected, preferably, in loop formation to each of the conveyors, the length of one cable loop decreasing as the associated conveyor is elevated and the length of the other cable loop increasing as the associated conveyor is lowered. In accordance with the invention, undue deterioration of this active cable portion containing the described loops is prevented in the manner described above.

Various other objects, advantages and features of our invention will become apparent from the following detailed description.

Our invention resides in the novel cable system, combinations and arrangements of the character hereafter described and claimed.

Figure 2:
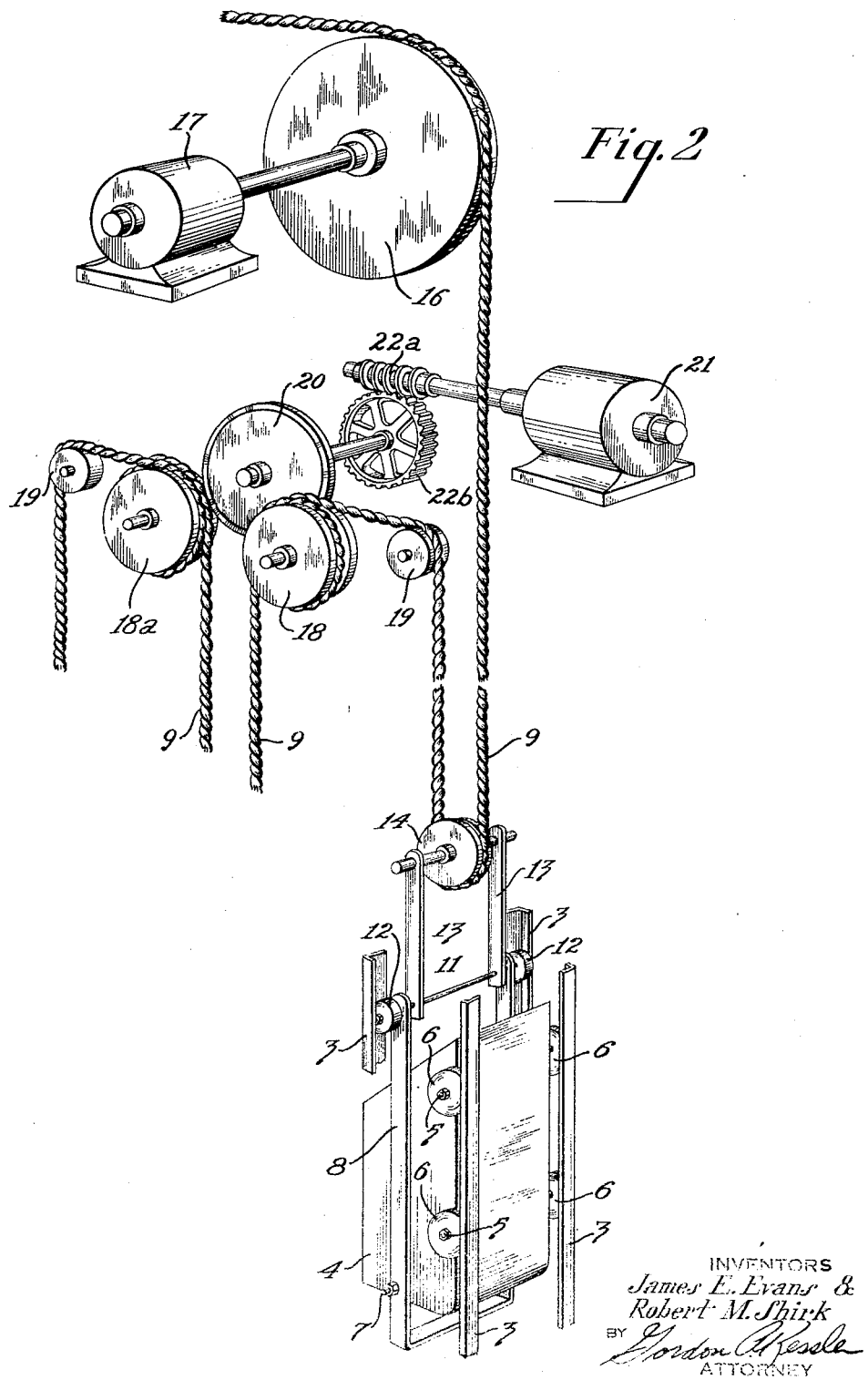

For an understanding of our invention and for an illustration of one of the forms thereof, reference is to be had to the accompanying drawings, in which:

Figure 1 is a sectional-elevational view, partly diagrammatic, illustrating the hoisting system of our invention; and Figure 2 is a perspective view illustrating a feature of the invention.

Referring to Fig. 1, I have shown duplicate hoisting mechanisms H which, in the form of the invention herein shown, face each other in symmetrical relation. Each mechanism H comprises a housing 1 having rising therefrom a fixed vertical standard 2 utilizable for supporting spaced sets of track members 3 which are disposed in a single plane or substantially so. As illustrated in Fig. 1, the lower ends of the respective sets of track members are inclined toward each other whereas the upper ends therof are inclined from each other. Associated with each set of track members 3 is a conveyor, bucket or skip 4 carrying upper and lower axles 5, Fig. 2, on which are journalled wheels 6 coactable with the track members 3, respectively. Fixed to the bottom of the bucket 4 is a transversely extending shaft 7, Fig. 2, having projecting ends to which a bail 8 is connected, the arrangement being such that the bucket 4, when in unloading position, is freely movable with respect to said bail 8.

A flexible cable or rope 9 formed from steel or other suitable material is connected to each bail 8 and, when actuated as hereinafter described, one bucket 4 is elevated while the other is descending. Thus, alternately, each set of wheels 6 guide the associated bucket 4 from its lower loading position to the upper unloading or discharge position where it is tilted with respect to the associated bail 8 for discharge purposes and then automaticaly returned to its upright position prior to descent thereof to loading position. Hoisting mechanisms of the character described are well known in the art and the description referred to above is considered as affording a sufficient basis for an understanding of the invention hereinafter to be described.

As indicated in Fig. 2, each bail 8 carries a transversely extending axle 11 having wheels 12 secured to the respective opposite ends thereof, these wheels 12 being coactable, respectively, with one set of the track members 3. Loosely pivoted on the axle 11 are a pair of spaced links 13 which support a freely rotatable pulley 14, or equivalent.

In the form of the invention herein shown, although not necessarily, a pair of pulleys or wheels 16, 16a are disposed symmetrically above the hoisting mechanisms H. These pulleys occupy the same transverse plane and are journalled for rotatable movement in any suitable manner, not shown. As illustrated in Fig. 2, the pulley 16 is adapted to be rotated by an electrical motor 17, or equivalent, which supplies the power for operating the disclosed mechanism.

Disposed below the aforesaid pulleys are a pair of duplicate pulleys or wheels 18, 18a which are flanked, on opposite respective sides thereof, by pulleys 19, or equivalent, the pulleys 18, 18a and 19 being disposed in the same plane as the pulleys 16, 16a. As hereinafter described, it is a feature of the invention that driving power is applied to the pulleys 18 and 18a when desired and, to this end, any suitable arrangement may be utilized. Thus, for example, a disk 20, Fig. 2, may be disposed in frictional or gear-meshing engagement with said pulleys 18 and 18a, power being supplied to said disk 20 by an electrical motor 21, or equivalent, which may be connected thereto by gear mechanism comprising a worm 22a connected to the armature of motor 21; said gear mechanism further comprising a worm wheel 22b coactable with the worm 22a and connected to the disk 20.

In accordance with the invention, the hereinbefore described cable 9 extends from a reel 23, upwardly over the pulley 18a and the adjacent idler pulley 19, downwardly beneath the pulley 14 of the bucket 4 at the left, Fig. 1, upwardly over the pulleys 16a and 16, downwardly beneath the pulley 14 of the bucket 4 at the right, Fig. 1, upwardly over the adjacent idler pulley 19 and the pulley 18 and then downwardly to a suitable receptacle 24 or the like. It will be understood, then, that there is a zone through which a portion of the cable 9 extends from the pulley 18a to the pulley 18 by way of the loops extending to the respective buckets 4. It is this cable portion which is actuated to elevate and lower said buckets 4 and, hence, said cable portion will be hereinafter referred to as the "active cable portion."

Initially, for purposes of explanation, it will be assumed that the motor 21 is deenergized. It will also be assumed that the active portion of the cable 9 is bound to and, hence, incapable of moving with respect to the pulleys 18, 18a which, when the motor 21 is deenergized, remain stationary for the reasons hereinafter described. To this end, the cable may be looped around each of said pulleys as indicated in Fig. 2 and it follows, therefore, in effect, that said active portion of the cable 9 is anchored to the pulleys last named.

When the conditions are as described above and with the parts positioned as shown in Fig. 1, the motor 17 may be energized to rotate the pulley 16 in a clockwise direction. In so doing, the active cable portion between the anchoring pulleys 18, 18a is actuated to cause the cable loop at the left to be shortened whereas the cable loop at the right is lengthened. As a result, the bucket 4 at the left (which has previously been filled with material as hereafter described) is elevated to the position thereof shown by the dotted lines and automatically tilted to discharge the previously loaded material therefrom. Simultaneously, the bucket 4 at the right descends from its upper position to the lower position thereof. When the two buckets 4 reach the respective positions last described, rotation of the pulley 16 is discontinued. Thereupon, after the bucket 4 at the right has been loaded, the direction of rotation of the pulley 16 is reversed and the buckets 4 are returned to the respective full line positions thereof shown in Fig. 1.

Any suitable mechanism as known in the art may be utilized for automatically controlling operation of the buckets 4 in the manner described above. The details of such mechanism form no part of the present invention and, therefore, description thereof has been omitted from this specification.

During the operation described above, the weight of the buckets 4 and the material carried thereby tends to rotate the pulley 18 clockwise and the pulley 18a counter-clockwise, Fig. 1. Despite this, however, these pulleys remain stationary by reason of the rotation-impeding effect exercised on the worm wheel 22b by the worm 22a. When the motor 21 is operated for cable-feeding purposes as hereinafter described, the worm 22a effectively rotates the worm wheel 22b to thereby rotate the pulleys 18a, 18 in a counter-clockwise direction, Fig. 1. This operation proceeds in the intended manner during operation of the hoisting system since, due to the described relation which exists between the worm 22a and the worm wheel 22b, the weight of the buckets 4 and the contents thereof is ineffective to produce any rotation of the pulleys 18a, 18 or to prevent rotation thereof under the control of the motor 21.

Hoisting cables of the character herein described become worn during continued operation of the hoisting mechanism and, in prior practice, it has been necessary to replace the cable as an entirety when such a worn condition develops to a sufficient extent. When this is to be done, it becomes necessary to discontinue operation of the hoisting system and this, when continuous elevation of material is required, is highly undesirable. In accordance with the invention, the necessity for discontinuing operation to replace a worn cable as noted above is obviated in a novel manner as hereinafter described.

Thus, referring to Fig. 1, the hereinbefore described reel 23 has wound thereon an extended length of unused or new cable. At any time during operation of the hoisting system, the motor 21 may be utilized to rotate the pulleys 18a and 18 in a counter-clockwise direction, Fig. 2, and thereby move the cable 9 in such manner that a portion of the unused cable from the reel 23 moves with respect to the pulley 18a into the described zone of the active cable portion and, in so doing, is incorporated in the latter. Simultaneously, a portion of used cable having the same length as said unused cable portion moves with respect to the pulley 18 from said zone of the active cable portion and hence, is withdrawn from the latter. This action occurs by reason of the fact that the pulleys 18a and 18 have the same diameter. Some elongation of the active cable portion may occur during operation of the hoisting system and to compensate for this, it may be desirable for the diameter of the pulley 18 to be slightly greater than that of the pulley 18a so that the length of used cable which is withdrawn from the aforesaid zone is slightly greater than the length of unused cable which is introduced thereinto. As a result, during continued intermittent or non-intermittent operation of the motor 21 for cable-feeding purposes as described above, wear of the active cable portion, as imposed by the pulleys or rollers which it engages, is distributed substantially in a uniform manner.

The rate at which cable is thus supplied to and withdrawn from the zone of the active cable portion should be selected so that said active cable portion does not deteriorate below a safe operating limit. To this end, during each twenty-four hour period or other suitable interval, a selected suitable length of cable should be supplied to and withdrawn from the aforesaid zone in the manner stated. Obviously, during repeated operation of the motor 21 each of these cable lengths moves progressively from the pulley 18a to the pulley 18 and, in so doing, is successively in frictional engagement with each of the pulleys following the pulley 18a. Necessarily, each cable length is worn to some extent by each of the pulleys and the total amount of this wear should be insufficient to cause cable deterioration below safe operating limits. In accordance with the invention and as stated, such cable deterioration is controlled in a desired manner by properly selecting the rate of introduction of unused cable into and withdrawal of used cable from the zone between the pulleys 18a and 18.

Thus, it is a feature of our invention that, in so far as cable wear is concerned, continuity of operation of the hoisting mechanism is dependent only on the amount of unused cable which is available for introduction into the system. This, in turn, is dependent upon the storage capacity of the reel 23 and, in lieu of this reel, it shall be understood that any other suitable arrangement may be provided for storing a desired quantity of unused cable for the purpose stated.

The motor 21 hereinbefore described may operate continuously so that, at suitable rate per unit of time, there is constant introduction of unused cable into the aforesaid zone and constant withdrawal of used cable therefrom. Or, if desired, the motor 21 may be operated intermittently to accomplish this purpose.

It was hereinbefore stated that the cable 9, in effect, is anchored to the pulleys 18, 18a during operation of the hoisting system. This condition is not affected by operation of the motor 21 as and for the purpose described above. Thus, either during operation or non-operation of said motor 21, the cable 9, in so far as it is influenced by operation of the motor 21 and the buckets 4, is anchored to said pulleys 18, 18a and, hence, is incapable of moving with respect to the latter. When the motor 21 is operated to rotate the pulleys last named, it is true that the cable 9 does move with respect thereto but this is without effect upon the anchoring action which the pulleys 18, 18a exercise on the cable 9 to resist slippage thereof during operation of the hoisting system.

It is a feature of the invention, then, that, during normal operation of the hoisting system and under the control of the motor 21, unused cable may be introduced into the zone between the pulleys 18a, 18 and used cable withdrawn therefrom. The invention, however, is not to be thus limited. Thus, the motor 21 may be operated for the purpose stated even though the hoisting system is not operating under the control of the motor 17. Hence, the invention is applicable to hoisting systems which operate either continuously or non-continuously.

For purposes of explanation, the invention has been illustrated and described with respect to a hoisting system which, generally, is diagrammatic in character. Obviously, in actual practice, there may be wide departure from the disclosed system particularly as regards the pulley system, the power source for hoisting purpose, the arrangement for introducing cable into and withdrawing cable from the zone between the pulleys 18a and 18, the arrangement for anchoring the cable at the respective ends of said zone, etc. More particularly, it will be understood that the disk 20, the gear mechanism comprising the gear wheels 22a and 22b and the motor 21 may be omitted and, if so, the cable may be otherwise moved for the purpose described. Thus, for example, the used portion of the cable extending below or from the roller 18 may be actuated in suitable manner, when desired, to move the cable as a unit so that unused cable is introduced into and withdrawn from the zone of the active cable portion. Except, then, as set forth in the appended claims, the invention is not to be limited to the hoisting system herein disclosed.

It shall be understood that the invention is not to be limited to a system comprising a pair of the hoisting mechanisms H. If desired, one of these mechanisms may be omitted although, as will be understood, the cable loop leading to the omitted mechanism should be retained. In view of the previous description, it will be understood that the motor 21 or equivalent is operative, as regards the single hoisting mechanism, for introducing unused cable into the zone of the active cable portion and withdrawing used cable therefrom.

It was hereinbefore stated that the invention relates particularly to a hoisting system adapted for continuous operation. A hoisting system of this character is required, for example, in the art of converting hydrocarbon material in a system wherein spent contact material is elevated to the top of a regenerating housing and regenerated contact material is elevated to the top of a reaction housing, the contact material gravitating downwardly through these housings for purposes well understood in the art.

Thus, referring to Fig. 1, a hydrocarbon converting system of the character noted is shown as comprising a reaction housing 25 and a regenerating housing 26. A conduit 27 leads from the lower end of the reaction housing 25 to a chute 28 associated with the housing 1 at the right. Similarly, a conduit 29 leads from the lower end of the regenerating housing 26 to a chute 30 associated with the housing 1 at the left. Chutes 31 and 32 extend from the respective unloading positions of the hoisting mechanisms H and communicate with the respective upper ends of the housings 25 and 26.

As indicated in Fig. 1, the chutes 28 and 30 are adapted, alternately, to deliver contact material to the conveyors or buckets 4 while they are in loading position. The chutes 31 and 32 are adapted, alternately, to deliver contact material from the respective unloading positions of the buckets 4 to the reaction housing 25 and the regenerating housing 26.

Assuming that the parts are positioned as shown by the full lines in Fig. 1, the regenerated contact material from the lower end of the regenerating housing 26 moves, under the influence of gravity, through the conduit 29, the chute 30 and thence into the adjacent bucket 4. At this time, the bucket 4 of the hoisting mechanism H at the right, Fig. 1, is in unloading position so that spent contact material passes therefrom to the upper end of said regenerating housing 26 by way of the chute 32. During this operation, a suitable arrangement, not shown, is utilized to temporarily discontinuing passage of spent contact material from the lower end of the conduit 27.

After the bucket 4 of the hoisting mechanism

H at the left, Fig. 1, has been filled with regenerated contact material, the hoisting system is operated to elevate the bucket last named to unloading position and to lower the other bucket 4 to loading position. The respective buckets remain in these positions for an interval during which spent contact material passes from the lower end of the reaction housing 25 by way of conduit 27 and thence through the chute 28 into the bucket 4 of the hoisting mechanism H at the right, Fig. 1. As this operation proceeds, regenerated contact material passes from the elevated bucket 4 to the upper end of the reaction housing 25 by way of the chute 31. While this happens, a suitable arrangement, not shown, is utilized to temporarily discontinue passage of regenerated contact material from the lower end of the conduit 29.

Despite the foregoing description relating to elevation of a particular kind of material by the buckets 4, it will be understood that there is to be no limitation of the invention in this respect. Obviously, the hoisting system of the invention may be utilized as desired for elevating any suitable material from a lower loading station to an upper unloading station.

While the invention has been described with respect to a certain particular preferred example which gives satisfactory results, it will be understood by those skilled in the art, after understanding the invention, that various changes and modifications may be made without departing from the spirit and scope of the invention and it is intended, therefore, in the appended claims to cover all such changes and modifications.

We claim as our invention:

1. In a cable-operated elevating device, a cable, spaced rotatable members for fixedly anchoring said cable intermediate the ends thereof to provide an active cable portion, said active cable portion comprising a loop suspended between one of said rotatable members and a cable-supporting pulley over which said active cable portion is passed, a load-supporting device suspended by said loop, means for rotating said cable-supporting pulley alternately in opposite directions for lengthening and shortening said loop and thereby respectively lowering and raising said load-supporting device, said cable being further provided with an integral inactive portion extending beyond said rotatable members to a cable supply reservoir, and means for rotating said spaced rotatable members to incorporate a desired length of the inactive cable into the active cable portion and simultaneously withdraw some of the previously active cable portion therefrom.

2. In combination, a bucket, a cable having an unused portion extending toward a zone wherein the active portion of the cable is connected to said bucket, means for supporting said active cable portion for movement in said zone, means for operating said active cable portion to move said bucket from a loading position to an unloading position, and means operative during operation of said second named means for incorporating some of the unused cable in the active cable portion and withdrawing some of the used cable from said active cable portion, said last named means comprising: a feeding pulley around which part of said unused portion of the cable is wound, driving means operatively connected to said feeding pulley and being operative when energized to rotate said pulley in a direction for incorporating some of the unused cable in the active cable portion and operating to restrain rotation of said pulley when not so energized.

3. In combination, a bucket, a cable having an unused portion extending toward a zone wherein the active portion of the cable is looped to said bucket, means for supporting said active cable portion for movement in said zone, means for moving said active cable portion in one direction to elevate said bucket from a lower to an upper position, said active cable portion moving in reverse during descent of said bucket, and mechanically operated means for incorporating some of the unused cable from said active cable portion, said mechanically operated means comprising a pair of spaced pulleys around which said cable is wound at respective opposite ends of said active cable portion, driving mechanism operatively associated with said spaced pulleys to restrain rotation of said pulleys when said driving mechanism is stationary and to cause rotation of said pulleys when said driving mechanism is actuated, said driving mechanism while thus actuated causing rotation of one of said spaced pulleys in a direction effecting the said incorporation of unused cable at one end of said active portion and causing rotation of the other of said pulleys in a direction effecting said withdrawal of used cable at the other end of said active portion, the length of the unused portion of said cable being substantial so that operation of said last named means at the proper rate insures maintenance over a long period of time of an active cable portion having the requisite strength.

4. In combination, track means extending from a lower loading position to an upper unloading position, a bucket guided by said track means, a cable having an unused portion extending toward a zone wherein the active portion of the cable is looped to said bucket, means for supporting said active cable portion for movement in said zone, means for operating said active cable portion to move said bucket between said positons, and rotatable means for moving said cable to incorporate some of the unused cable in the active cable portion while withdrawing some of the used cable from said active cable portion, said rotatable means comprising a pair of spaced pulleys around which said cable is wound at respective opposite ends of said active cable portion, driving mechanism operatively associated with said spaced pulleys to restrain rotation of said pulleys when said driving mechanism is stationary and to cause rotation of said pulleys when said driving mechanism is actuated, said driving mechanism while thus actuated causing rotation of one of said spaced pulleys in a direction effecting the said incorporation of unused cable at one end of said active portion and causing rotation of the other of said pulleys in a direction effecting said withdrawal of used cable at the other end of said active portion.

5. In combination, track means extending from a lower loading position to an upper unloading postion, a bucket guided by said track means, a pair of spaced cable-anchoring means, a cable having an unused portion extending toward and into engagement with one anchoring means from which the active portion of the cable extends to the other anchoring means after being looped to said bucket, said pair of cable-anchoring means defining the respective ends of a zone wherein said active cable portion is supported so as to move said bucket between said positions, means for operating said active cable portion for the purpose stated, and means for moving said cable with respect to said spaced cable-anchoring means while they remain in cable-anchoring relation to progressively introduce the unused portion of the cable into said zone while progressively withdrawing the used portion thereof from said zone.

6. In combination, sets of track means extending, respectively, from lower loading positions to upper unloading positions, a bucket guided by each track means, a pair of spaced cable anchoring means, a cable having an unused portion extending toward and into engagement with one anchoring means from which the active portion of the cable extends to the other anchoring means, said active cable portion, in the zone between said pair of anchoring means, being adapted to define, first, a long loop which is connected to one bucket while in loading position and, second, a short loop which is connected to the other bucket while in unloading position, roller means for supporting said active cable portion, means for operating said active cable portion to move said buckets in reverse directions along the respective sets of track means, and means for incorporating some of the unused cable in the active cable porton and withdrawing some of the used cable from said active cable portion.

7. In combination, sets of track means extending, respectively, from lower loading positions to upper unloading positions, a bucket guided by each track means, a pair of spaced cable-anchoring means, a cable having an unused portion extending toward and into engagement with one anchoring means from which the active portion of the cable extends to the other anchoring means, said active cable portion, in the zone between said pair of anchoring means, being adapted to define, first, a long loop which is connected to one bucket while in loading position and, second, a short loop which is connected to the other bucket while in unloading position, roller means for supporting said active cable portion, means for operating said active cable portion to move said buckets in reverse directions along the respective sets of track means, and means for moving said cable with respect to said spaced anchoring means while they remain in cable-anchoring relation to introduce some of the unused portion of the cable into said zone while withdrawing some of the used portion thereof from said zone, the length of the unused portion of said cable being substantial so that operation of said last named means at the proper rate insures maintenance over a long period of time of an active cable portion having requisite strength.

8. In combination, sets of track means extending, respectively, from lower loading positions to upper unloading positions, a bucket guided by each track means, a pair of spaced rollers to each of which the cable is adapted to be anchored, a cable having an unused portion extending toward and into engagement with one roller from which the active portion of the cable extends to the other roller, said active cable portion, in the zone between said pair of spaced rollers, being adapted to define, first, a long loop which is connected to one bucket while in loading position and, second, a short loop which is connected to the other bucket while in unloading position, roller means for supporting said active cable portion, means for operating said active cable portion to move said buckets in reverse directions along the respective sets of track means, and means for moving said cable with respect to said spaced rollers while they remain in cable-anchoring relation to progressively introduce the unused portion of the cable into said zone while progressively withdrawing the used portion thereof from said zone.

9. In combination, sets of track means extending, respectively, from lower loading positions to upper unloading positions, a bucket guided by each track means, a pair of spaced rollers to each of which the cable is adapted to be anchored, a cable having an unused portion extending toward and into engagement with one roller from which the active portion of the cable extends to the other roller, said active cable portion, in the zone between said pair of spaced rollers, being adapted to define, first, a long loop which is connected to one bucket while in loading position and, second, a short loop which is connected to the other bucket while in unloading position, roller means for supporting said active cable portion, means for operating said active cable portion to move said buckets in reverse directions along the respective sets of track means, and means for moving said cable with respect to said spaced rollers while they remain in cable-anchoring relation to progressively introduce the unused portion of the cable into said zone while progressively withdrawing the used portion thereof from said zone, said last named means comprising a source of power and a mechanical connection extending to both of said rollers for operating them jointly for the purpose stated.

10. In combination, a pair of buckets, a cable having an unused portion extending toward a zone wherein the active portion of the cable is connected to said buckets, means for supporting said active cable portion for movement in said zone, means for operating said active cable portion to move said buckets alternately from loading positions to unloading positions, and means operative during operation of said second named means for incorporating some of the unused cable in the active cable portion and withdrawing some of the used cable from said active cable portion, said last named means comprising: a feeding pulley around which part of said unused portion of the cable is wound, driving means operatively connected to said feeding pulley and being operative when energized to rotate said pulley in a direction for incorporating some of the unused cable in the active cable portion and operating to restrain rotation of said pulley when not so energized.

11. In a material hoisting device the combination of a skip, a pair of spaced cable anchoring means, a cable having an intermediate active portion looped to said skip and having terminal inactive portions, said active portion at the opposite ends thereof being anchored by engagement with said spaced anchoring means respectively to permit lengthwise movement of the active portion of the cable while maintaining said inactive portions stationary, means for moving the active portion of the cable lengthwise alternately in opposite directions to thereby actuate said skip, and means for moving said cable with respect to said cable-supporting means, while they remain in cable-anchoring relation, progressively to feed a previously inactive portion of the cable to one end of said active portion thereof while progressively withdrawing a previously active portion from the opposite end thereof.

JAMES E. EVANS.
ROBERT M. SHIRK.

(References on following page)

REFERENCES CITED

The following references are of record in the file of this patent:

UNITED STATES PATENTS

| Number | Name | Date |
|---|---|---|
| 125,978 | Neal | Apr. 23, 1872 |
| 141,513 | Nash | Aug. 5, 1873 |
| 821,708 | Edward | May 29, 1906 |
| 1,979,780 | Turney | Nov. 6, 1934 |
| 2,187,960 | Wood | Jan. 23, 1940 |
| 2,274,168 | Scharpenberg | Feb. 24, 1942 |

FOREIGN PATENTS

| Number | Country | Date |
|---|---|---|
| 633,634 | Germany | July 31, 1936 |